United States Patent [19]
Tanaka et al.

[11] 3,800,116
[45] Mar. 26, 1974

[54] APPARATUS FOR AUTOMATICALLY WELDING PIPE JOINTS FOR CYLINDRICAL MEMBERS SUCH AS STEEL PIPE PILES

[75] Inventors: Tohachiro Tanaka, Nagareyama; Kenichi Ishii, Tottori; Seiya Sasaki, Kawachinagano; Hiromi Shiraishi, Minoo, all of Japan

[73] Assignees: Sumitimo Metal Industries Limited, Osaka City; Construction Company Limited, Sakai City, Osaka Prefecture, both of, Japan

[22] Filed: Dec. 28, 1971

[21] Appl. No.: 212,909

[30] Foreign Application Priority Data
Dec. 29, 1970  Japan.......................... 45-137999[U]
May 27, 1971  Japan.......................... 46-43786[U]
July 29, 1971  Japan.......................... 46-68043[U]
June 1, 1970  Japan.......................... 46-38441[U]

[52] U.S. Cl. .......................... 219/60 A, 219/125 R
[51] Int. Cl. .............................................. B23k 9/02
[58] Field of Search...... 219/60 A, 60 R, 61, 125 R, 219/125 PL, 126, 158, 161; 228/45; 269/8, 59, 77, 78, 83, 303

[56] References Cited
UNITED STATES PATENTS

| | | | |
|---|---|---|---|
| 3,604,612 | 9/1971 | Miller | 219/60 A X |
| 3,084,244 | 4/1963 | Rieppel et al. | 219/60 A |
| 1,478,900 | 12/1923 | Huston et al. | 269/8 X |
| 3,082,799 | 3/1963 | Kennedy | 269/8 X |
| 3,207,881 | 9/1965 | Pagan | 219/60 A |
| 2,956,147 | 10/1960 | Baker | 219/125 |
| 3,102,187 | 8/1963 | Coscia | 219/60 A |

Primary Examiner—C. L. Albritton
Attorney, Agent, or Firm—Watson, Cole, Grindle & Watson

[57] ABSTRACT

This invention relates to an automatic welding apparatus wherein irrespective of whether a cylindrical member such as steel pipe pile is upright or inclined a welding machine body can be easily fitted to the cylindrical member through a fastening supporter which is free to open and close, supports the cylindrical member and serves as a rail for running the welding machine and therefore not only the operating time can be reduced but also a favorable bead can be obtained by providing a self-running welding machine with single or plurality of welding electrode heads.

6 Claims, 12 Drawing Figures

APPARATUS FOR AUTOMATICALLY WELDING PIPE JOINTS FOR CYLINDRICAL MEMBERS SUCH AS STEEL PIPE PILES

In the case of driving a cylindrical member, for example, a steel pipe as a foundation pile for a structure into the ground, the length of the steel pipe will be restricted and limited by the limitation of the height of the pipe driving machine. Therefore, in case the pile driving length is so large as to require a foundation pile longer than the steel pipe, it will be necessary that the steel pipe should be driven into any depth, then should be welded along the groove and further should be driven in with a pile driving machine. In such pile driving as in a civil engineering work, it has been customary to drive the pile mostly in the vertical direction. But, recently a working method of driving piles as inclined has come to be much hoped for particularly in the foundation works of structures subjected to horizontal forces, for example, quay works, highway reinforcing foundation pile works and bridge foundation pile works.

As a conventional pipe jointing method for the above mentioned steel pipe piles, a hand-welding method has been used over the entire peripheral surface by butt-welding along the groove by a welder, a method wherein only the welding wire is automatically fed to the welding part and the welding electrode head is gradually moved to the groove by hand, or a method wherein a guide chain is wound near a groove formed between a lower pile and an upper pile placed above it on the same axis. A welding machine is effected by using the guide chain as a guide, and is manually or automatically run on the chain to weld the peripheral surface.

However, even in the case of using the above mentioned chain, during the welding, the position of the supporting chain will gradually vary with the progress of the welding and the relative positions of the electrode and groove will vary, and later it will be necessary to patch the work by hand-welding. Further, in order to fit such welding jig as a chain always in the same horizontal plane and to run the welding machine in the horizontal plane, there are various defects in that the position of the jig must be always secured, the workability is low, many troubles are required for the fitting, removable and preparation of the apparatus, it is necessary to mark the fixed position whenever the steel pipe is connected in the case of fitting a guide chain so that the time loss is also large, the efficiency is very low, a high degree of skill is required of the welder in welding by hand, the welder is greatly fatigued because of his operating posture, so that the bead is irregular and burns through, and further the maximum current is kept below 150 amperes at most in hand-welding (therefore the workability is extremely reduced). It should be noted that, since before the present application, a conventional technique has been partly used wherein comparatively short steel pipe piles are horizontally set, are wound with a chain or band and are welded on the periphery by rotating them or moving a welding machine along the band so as to be long and the obtained long steel pipe pile is erected and driven. However, there have been comparatively few prpposals of the technique wherein steel pipe piles of a large diameter are welded and jointed in turn during the pile driving work and, in some case, even as inclined piles driven as inclined.

An object of the present invention is to provide an automatic welding apparatus in a process for jointing pipes for steel pipe piles wherein the above mentioned defects are eliminated, and more particularly to provide an apparatus for automatically welding pipe joints for steel pipe piles wherein means for supporting and running the welding jig in the same horizontal plane are provided. The welding can be made automatically so that the skill of the welder is not relied on, and it is possible to weld without high welding current becoming irregular and burning through.

Figure 1:
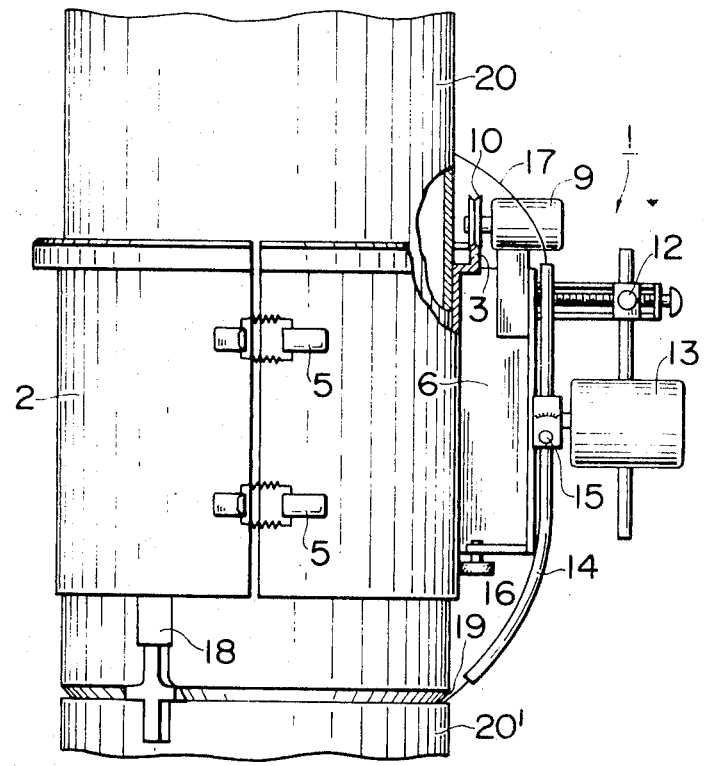
FIG. 1 is a partly sectioned side view of an automatic welding apparatus according to the present invention.
Figure 1A:
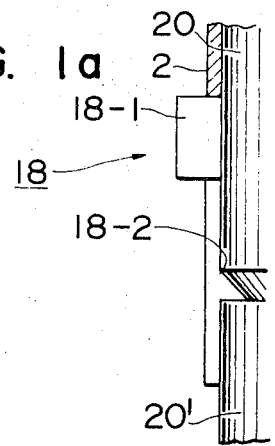
FIG. 1a is a partly magnified view of FIG. 1.
Figure 2:
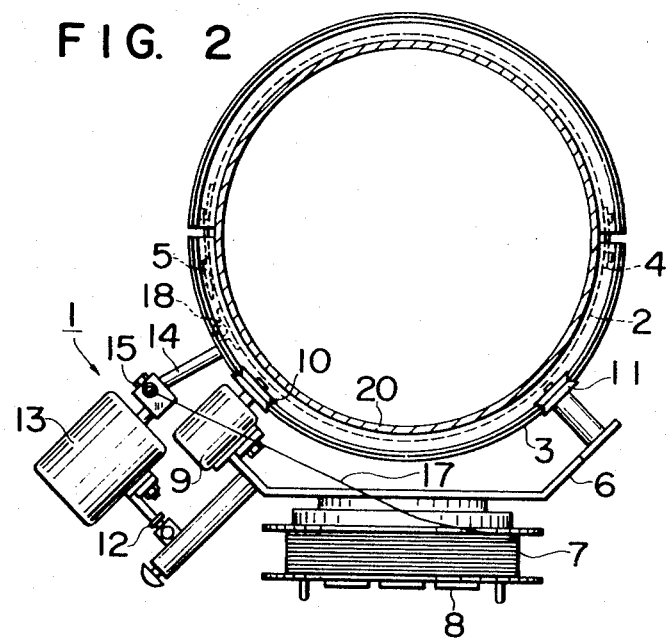
FIG. 2 is a plan view of FIG. 1.
Figure 3:
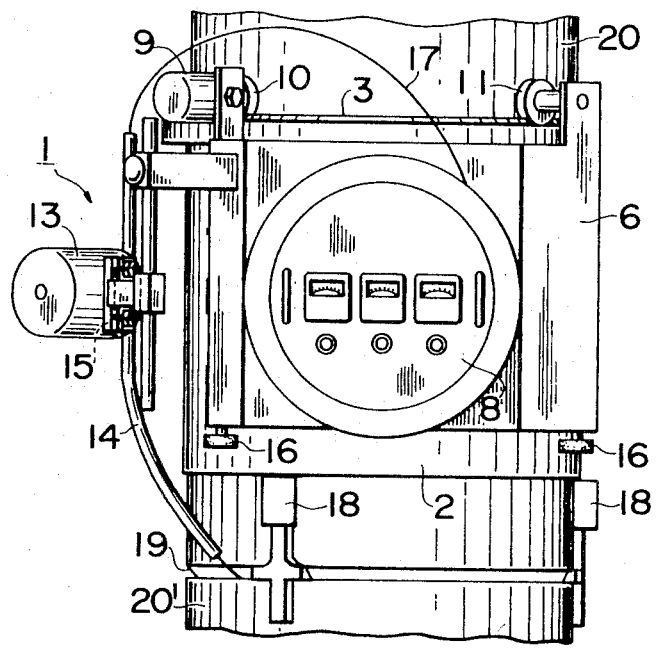
FIG. 3 is an elevation of FIG. 1.

The first embodiment of the present invention shall be explained with reference to FIGS. 1 to 3. This embodiment is intended to eliminate the defects of conventional methods and to develop an automatic welding apparatus having an opening and closing two-divided welding supporter having a guide rail for a welding machine body so as to be simply handled and easily operated even by an unskilled worker. That is to say, a supporter 2 carrying a welding machine body or unit 1 which comprises a current and voltage regulating and switching device to be hereinafter more fully described, wire reel, automatic wire feeding device, electrode head, self-running device and control board, is a two-part cylindrical band having an inner diameter slightly smaller than the outer diameter of a steel pipe pile 20. Its upper edge part is projected outwardly in a well known manner to be in the form of a rail 3, or an angle member is provided in the form of a ring on the above mentioned cylindrical band so as to be a rail 3. One cut part of the two divided parts is made free to open and close and the other cut part is provided with any number of such proper fastening devices as buckles 5. The above mentioned welding machine body 1 has a wire feeding coil 7 and a control board 8 in the center of a supporting frame 6 bendable at any angle in each side part. It is further provided at the upper and with a V-shaped roller 10 rotating as operatively connected with a driving motor 9 on one side and a free roller 11 on the other side, and is fitted in the middle end part with a wire feeding device 13 made adjustable in the vertical direction with a height adjusting device 12, electrode holder 14 and holder fitting angle adjusting device 15 substantially integrally. In place of the supporting frame 6 being bendable, the free roller 11 may be adjusted relatively to the rail 3.

In the above mentioned welding machine body, in the case of butt-welding an upper pile 20 and lower pile 20', first of all, a pawl 18–2 of a magnet gauge 18 is hung on a joint part or groove and a magnet 18–1 attracts the lower end part of the upper pile. This magnet gauge 18 is to fit the welding supporter 2 in a in a spaced relation to the groove and in parallel with the joint. Any proper number of such magnet gauges 18 are used depending on the diameter of the pile. Then the supporter 2 is opened, is fitted to the lower part of the upper pile by using the magnet 18-1 of the above explained magnet gauge as a footstool and is secured to the steel pipe pile 20 with the fastening devices 5 after it is confirmed that the lower end of the supporter 2 is uniformly in contact with each magnet gauge. Then the magnet gauge 18 is removed, running rollers 10 and 11 are fitted on the rail 3 of the supporter 2 and the welding machine body is suspended. Then the fitting angle of the electrode holder 14 is adjusted with the adjusting devices 12 and 15 so that the electrode wire 17 fitted to the holder 14 may be positioned on the welding line or groove 19 to complete the preparation. Then, if the driving motor 9 and wire feeding device 13 are operated with the control board 8, the welding device 1 will automatically move on the rail 3 at a fixed velocity and the welding will process automatically. The width (in the axial direction of the pipe) of the supporter 2 is so designed that the friction coefficient between the steel pipe pile 20 and supporter 2 may be large enough to prevent the supporter from slipping under the weight of the welding machine body 1 or the like during the welding. In order to increase the friction coefficient, it is effective to insert an elastic body on the inside surface of the supporter 2, that is, between the pile and supporter 2. After the completion of the welding, the welding machine body is removed from the rail 3, then the fastening devices 5 of the supporter 2 are released and the supporter is opened and is removed from the upper pile.

As mentioned above, in this embodiment, in a steel pipe pile driving operation, as the opening and closing type supporter having a rail on the upper peripheral edge is used and the welding machine body is provided to be free to run as hung on the above mentioned rail, the apparatus can be simply and quickly fitted and removed, the supporter will not be displaced, therefore a uniform welding bead can be obtained, thus the mechanical strength of the joint part will be higher than ever, the structure can be simpler and a higher effect will be developed.

Figure 4:
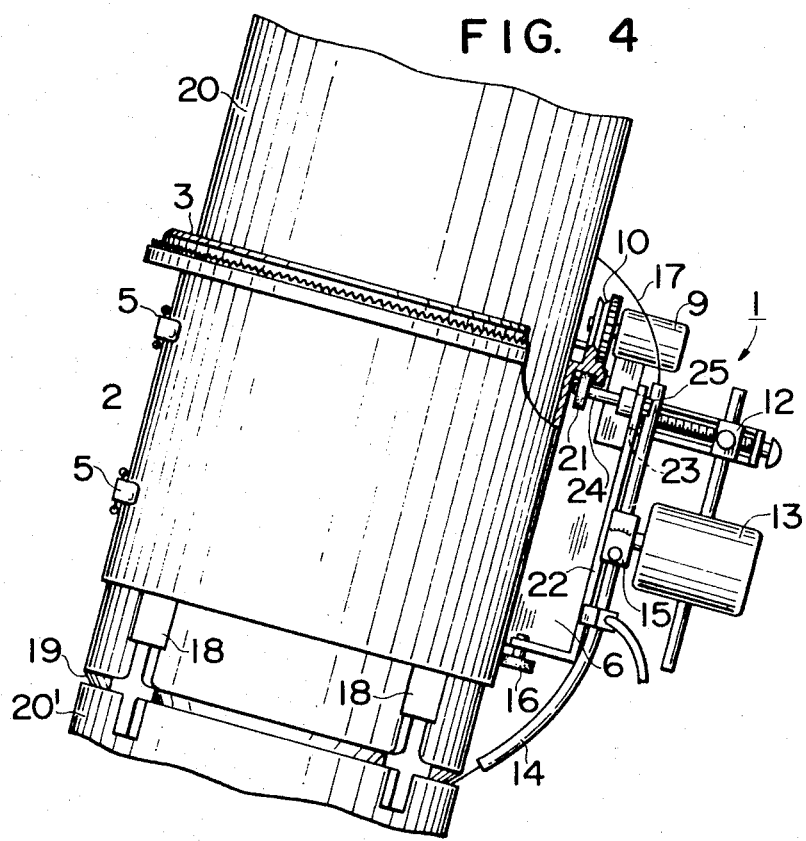
FIG. 4 is the same view as FIG. 1 of another embodiment of the present invention.
Figure 5:
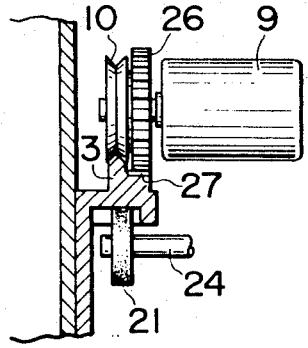
FIGS. 5 and 6 are partly magnified views of the roller part and supporter in FIG. 4.
Figure 6:
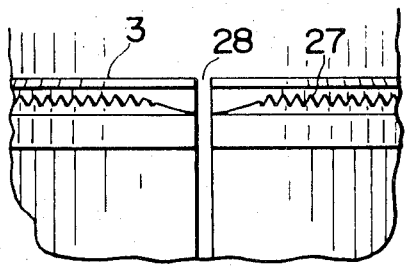

Shown in FIGS. 4 to 6 is a formation of an automatic welding machine body for inclined piles as a second embodiment. Here the basic arrangement of the first embodiment is followed. That is to say, basically the cylindrical supporter 2 supporting the welding machine body 1 comprises a two-part band-shaped cylinder provided with a guide rail 3 at the upper edge. One cut part of the cylinder is made free to open and close with a hinge and the other cut part is formed by providing any number of such proper fastening devices as buckles 5. In this case, the pile is driven diagonally as illustrated and the welding machine body is also required to run diagonally up and down. Therefore, the top ridge angle of the guide rail 3 is made preferably 45 to 75° so as to avoid the danger of a derailment, and so as to obtain a smooth running operation. A gripping roller 21 is provided below each the driving roller 10 and the free roller 11 so that the welding machine body 1 may be supported securely and smoothly by respective pairs of the upper and lower rollers. That is to say, the gripping roller 21 is fastened with a nut 25 from outside the base frame 6 by loosely passing a shaft 24 through a slot 23 in the longitudinal direction made in advance on the bent surface 22 of the base frame.

At the time of welding, the shaft 24 may be pushed up in the slot 23 and fastened with the nut 25. When the welding is completed, if the nut 25 is loosened and the shaft 24 is pushed down within the slot 23, the welding machine body 1 may be easily removed from the rail 3 of the supporter 2.

Although a simple example of the means of fitting and removing the above mentioned gripping roller 21 is disclosed the present invention is not intended to be so limited. In the case of an inclined pile, the driving roller 10 may be a roller of high friction resistance materials such as those of brake shoes. Further, in case the angle of inclination of the inclined pile is made large, a pinion 26 is mounted parallel to the driving roller 10, and a toothed rack 27 meshing with 26 is provided parallel to rail 3 at the upper edge of the supporter 2 so that the welding machine body 1 may be guided on the inclined rail 3 by the rack-pinion system with the torque of the driving motor 9. Also, to insure continued meshing of the rack and pinion parts at the joint of the rail sections of the cylindrical supporter, the supporter 2 may be so shifted that the split 28 of the supporter is at a position wherein the driving force is least required, that is, a position at the right or left end in FIG. 4. Also the joint of the rack 27 may be so made that the height of the tooth may be gradually reduced to an inclined state at the joint as in FIG. 6.

In the welding of inclined pile, when the welding machine body is brought to the lower portion of the annular rail set as inclined, the welding machine body is subjected to a force by which the lower end of the welding machine body 1 tends to separate from the outer peripheral surface of the supporter 2. Therefore, if the welding machine body is so provided that, even if it is overhung, the center of gravity of the machine may be outside a perpendicular line from the contact point of the driving roller, the lower part of the welding machine body will be always in contact with the supporter 2 through the guide roller 16 and will not separate. When the angle of inclination of the steel pipe pile becomes gradually larger, a larger load will be applied to the holding part of the guide rail 3, will obstruct the running and will be likely to influence the welding. However, if a rail is provided at the lower edge of the supported parallel to the rail at the upper edge thereof and the welding machine body 1 runs along both the upper and lower rails of the supporter 2, the above mentioned draw back will be entirely eliminated and a smooth welding operation will be effected.

In this embodiment, a cylindrical supporter having a rail at the upper peripheral edge is used, and a welding machine body having a running mechanism is provided for running along this rail, and a guide rail is held with a movable roller provided on the welding machine body side. Thus it contributes greatly not only to driving a pile in the vertical direction but also to the work of an inclined pile.

Figure 7:
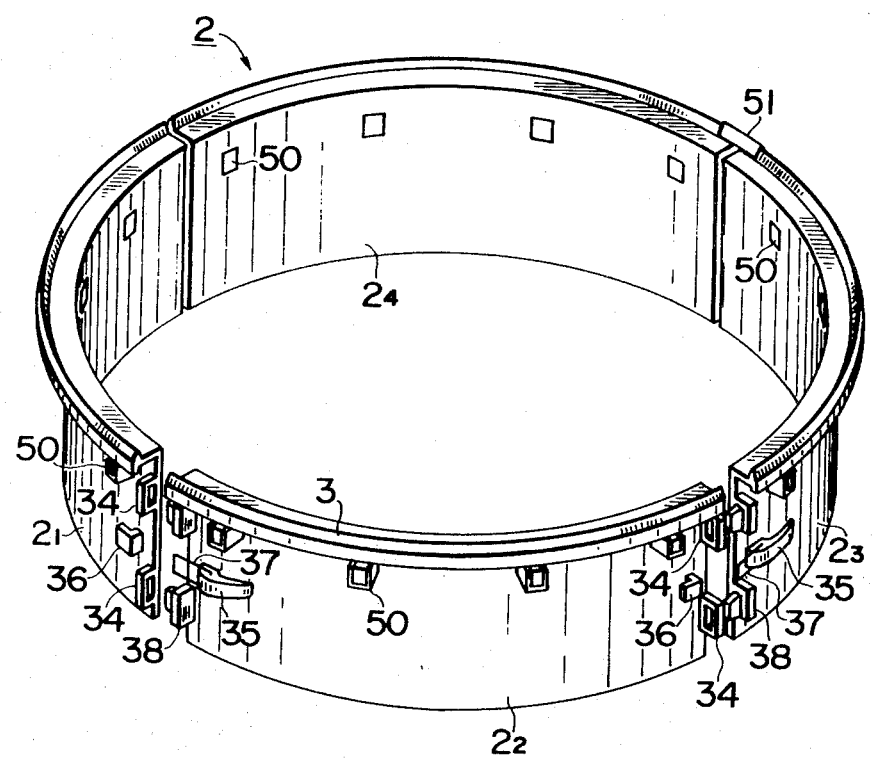
FIG. 7 is a perspective view of another embodiment of the suporter.
Figure 8:
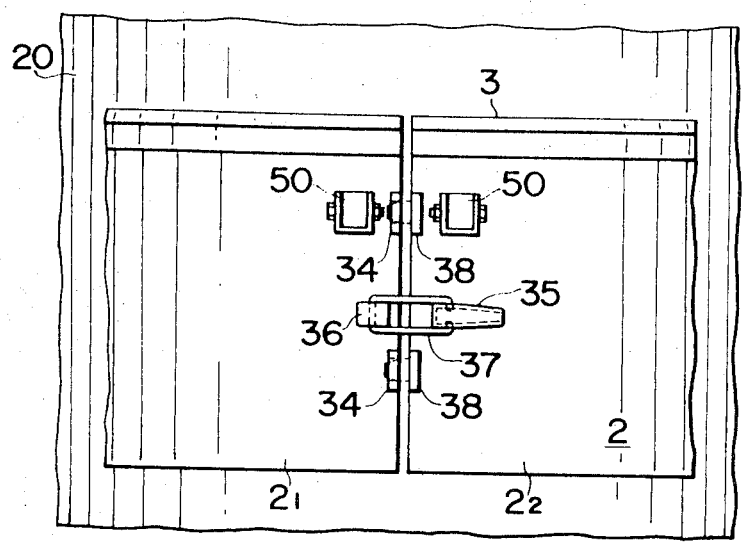
FIGS. 8 and 9 are side views of the supporter.
Figure 9:
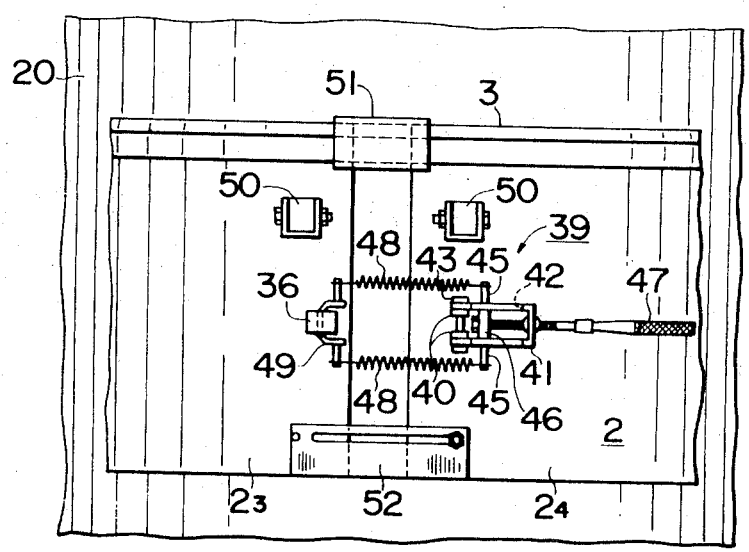

In each of the above mentioned embodiments, a two-part welding machine body supporter 2 has been described. However, when the outside diameter of the steel pipe pile is larger than 800 or 1,000 mm., the supporter itself will be considerably heavy and difficult to handle, and there may be defects such that considerable effort and time will be required for the fitting and removing operations thereby reducing the workability. Therefore, a segmental supporter is provided which can be divided into several parts. An example of such supporter is described in FIGS. 7 to 9. Here, four divided supporters $2_1$, $2_2$, $2_3$ and $2_4$ of a supporter 2 are provided by equally dividing into four parts a cylinder having an inside diameter slightly smaller than the outside diameter of a steel pipe 20 and provided with an annular guide rail 3 on the upper surface. A plurality of centering fitting recesses 34 are provided on the outer surface near one end of parts $2_1$, $2_2$, $2_3$ and a fastening buckle 35 having a hook 37 is mounted on the outer surface near the other end of such parts. A coperating hook receiver 36 is also provided near the one end of these parts. On the outer surface near one end of the remaining supporter $2_4$, fitting recesses 34 for projections 38 of the above mentioned supporter $2_1$ and a hook receiver 36 are provided and at, the opposite end thereof, a fastening buckle assembly 39 fitted with a spring and compensating for the tolerance of the outside diameter of the steel pipe pile is provided as shown in FIG. 9. Such assembly includes, a channel-shaped frame body 41 having two slots 42 located lengthwise in the channel, and two projecting plates 40 opposed to each other in the longitudinal direction of the pipe at a required spacing on the outer peripheral surface of the supporter $2_4$ with a bolt 43 loosely passing through 40 and 42 to interconnect them. Further, guide pin 45 provided at each of the upper and lower ends of slider 46 are located in slots 42. A handle 47 is threaded through the channel, with the end thereof being loosely set at the center of slider. A coil spring 48 is mounted on the guide pin 45 of slider 46 and a hook 49 is connected to the free ends of said springs. On the peripheral surfaces of the four divided supporters 2, such number of magnets 50 as are required depending on the weights of said supporters are removably fitted so that their attracting surfaces may be exposed inside said supporters 2. 51 is an auxiliary rail slidably fitted to the guide rail 3 of the supporter $2_4$.

When fitting the above mentioned supporter to a steel pipe 20 to be welded, first of all, one of the divided supporters $2_1$, $2_2$ and $2_3$ is attracted and fixed with the magnets 50 fitted to its outer peripheral surface. At this time, in order to keep the supporter in a spaced relation with the groove of the steel pipe pile and in parallel with the joint, the above described magnet gauges 18 are used. When the second one of the above mentioned divided supporters is fitted adjacent the first fitted divided supporter, fastening buckle 35 is erected, the hook 37 is engaged with the hook receiver 36 of the other supporter and the buckle 35 is pivoted inwardly. Both divided supporters will therefore be pulled to each other, and projections 38 provided on one supporter will fit in the centering recesses provided on the other supporter so that the supporters will be combined with each other. In the same manner as mentioned above, the third divided supporter is also fitted to the pipe wall. The remaining supporter $2_4$ is integrally combined by means of the fastening buckle 35 in one end part of supporters 2 in the same manner as is mentioned above and, the handle 47 of the fastening buckle assembly 39 for correcting the tolerance of the pipe diameter is gripped and erected, the hook 49 connected to the free ends of the springs being placed over the hook receiver 36 of the first fitted supporter $2_3$ and the handle is again rotated anticlockwise to combine them both. At this time, in this combining part, a gap will be produced by the tolerance of the outside diameter of the steel pipe 20. Therefore, the auxiliary rail 51 is removed, the guide rail is connected and added and further the contact surface 52 of the lower roller 16 of the welding machine body provided below is brought into contact in a fixed position to complete the supporter fitting operation.

According to the present invention, assembling of the divided supporters of the welding machine body can be completed accurately and quickly by one operator in 1.5 minutes by using a three-divided supporter for a steel pipe pile diameter of 1,000 mm., or by two operators in 1.5 minutes by using a four-divided supporter for a steel pipe pile diameter of 1,500 mm. Thus, the time required for the fitting can be greatly reduced, the operating efficiency can be improved and particularly the degree of contribution to the operation of driving steel pipe piles of a large diameter is very high.

Now an embodiment and effect of an apparatus intended to make the welding bead definite, to greatly reduce the welding time and to improve the general efficiency of a pile driving foundation work with the welding machine in each of the above mentioned embodiments shall be explained in the following.

Generally, in order to improve the welding efficiency, a large electric current is fed to the welding wire. However, when jointing steel pipe piles, such process will not be adequate. This is to say, the steel pipe pile will be partly deformed in the head part by the driving hammer and the groove working precision in the welding part will be so low that the joints of the steel pipe piles will be different to some extent and the groove gap will be nonuniform. If the steel pipe piles are welded by feeding a large current, they will burn through or burn off and will not be expected to be perfectly welded.

In the below described apparatus of the present invention, such defects are eliminated, a favorable welding bead is obtained, a highly efficient welding is made and the welding time can be greatly reduced.

Figure 10:
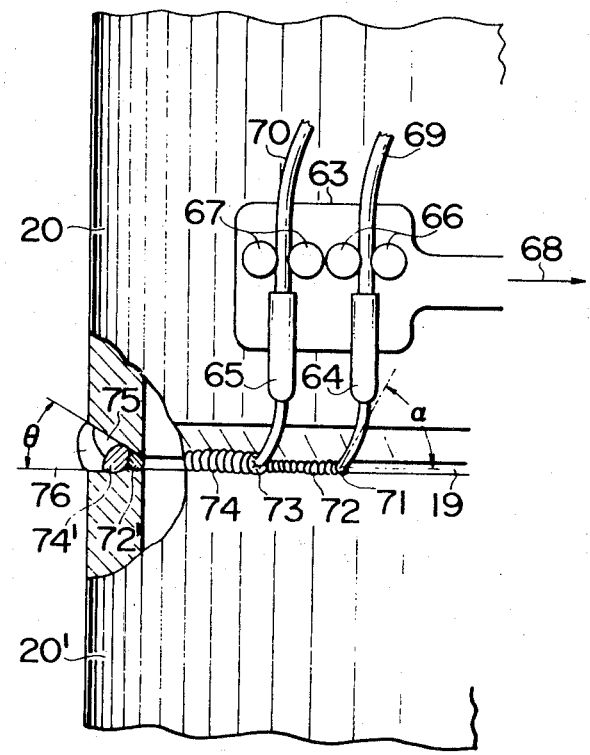
FIG. 10 is a view showing an embodiment of an automatic welding machine to be used in the present invention.

That is to say, the other embodiment of the present invention is a development of an apparatus wherein, when welding a groove by running an automatic welding machine around a steel pipe pile as upright or inclined, a first electrode head preceding the welding machine body 1 and a second electrode head following just after the first electrode head (if necessary, further a third electrode head) are respectively provided and, as in FIG. 10, a current of such a value as to cause no burning through or burning off is fed to the first electrode and a current larger than of the first electrode is fed to the second electrode (a current equal to or larger than that of the second electrode is fed to the third electrode) to form a multilayer bead.

Figure 11:
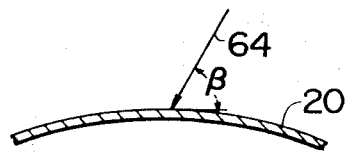
FIG. 11 is a partly magnified plan view of FIG. 10.

In FIGS. 10 and 11, a welding head 63 is fitted to a self-running welding apparatus as explained above and moves in a direction indicated by an arrow 68 along a welding groove 19. In the welding head 63, a first electrode 64 and a second electrode 65 following it at a fixed distance are both provided in tandem. The distance between th first electrode and the second electrode following it is kept so that the surface of the first layer bead 72' may remain melted by a depth larger than the molten depth of the second layer bead 74', the welding heat of the first layer may be well utilized and the bead may be prevented from burning off. (It is necessary that the back bead of the first layer welding part should be coagulated when the second electrode passes over the first layer bead. If the second layer bead is superposed on the first layer bead before the back bead is coagulated, the first layer bead will burn off back surface and the welding will become bad.) Therefore, the optimum distance is generally about 50 to 100 mm.

There are required devices for adjusting both electrodes in the vertical direction and devices for adjusting the secondary angle $\alpha$ and $\beta$ of wires 69 and 70 at welding points 71 and 73, respectively. The wires to be used as adapted to the object of the present invention are usually of a diameter of 3.2 mm., and are continuously automatically fed to the welding part through the feeding rollers 66 and 67.

The welding current to be fed to the preceding first electrode 64 when the welding head 63 makes the first rotation is made 350 to 420 amperes to first form a molten deposited metal 72 of a cross-section 72'. If the welding current is made less than 350 amperes, in case a difference is produced in the grooved jointing part between the lower pile 20' and upper pile 20 or in case the root gap is nonuniform, no favorable first layer will be produced. If the welding is made with a current higher than 420 amperes, in case the groove shape is not good, the molten metal will be likely to burn through or burn off. On the molten deposited metal 72 of the first layer made as mentioned above, a molten deposited metal 74 of a second layer of a cross-section 74' is formed by giving a welding current of 500 to 600 amperes with the following second electrode. In this case, the range of 500 to 600 amperes of the welding current is recommended as the most efficient value but will somewhat vary depending on the performance of the welding machine or the like.

A multilayer welding is made to obtain a perfect welding bead and to secure an expected mechanical strength under such welding condition as the case that the thickness of the steel pipe pile is large or the groove shape is bad. For this purpose, the welding head 63 is made to run by two or three rounds around the periphery and the welding current may be gradually increased in each round to be higher in the second round than in the first round and to be higher in the third round than in the second round to make a multilayer welding. In the multilayer welding, a large electric current can not be used for welding the first layer, because it causes the burn-through or burn-off in the first layer welding. However, it is preferable in a sense of efficiency of the welding to use the large electric current. In order to satisfy these two contrary conditions the present invention provides the completely stable back bead in the welding of the first layer and, then, feeds larger electric current in the welding of the second and following layers than that in the welding of the first layer so as to increase the welding efficiency. An example is shown in Table 1. This example is standard and will somewhat fluctuate if the size of the steel pipe pillar, the performance of the welding machine and the welding conditions vary. Further, in Table 2, the time required for the welding is shown as compared with that in the conventional method (a semiautomatic welding method wherein only the wire is automatically fed but the head is operated by hand). As evident also from the above mentioned results, according to the method of the present invention, the time required for one round of welding can be reduced much more than in any conventional method and the welding is shown to be completed within one-fifth to one-sixth the required time in the case of jointing steel pipe piles of a large diameter. Therefore, it is possible to reduce the waiting time for other related apparatus, to remarkably improve the general efficiency of the foundation work and to greatly reduce the cost of the work.

TABLE 1

| Test No. | Materials of steel pipe piles | Dimensions of steel pipe piles | | | | Welding conditions | | | | Number of layers |
|---|---|---|---|---|---|---|---|---|---|---|
| | | Outer diameter in mm. | Thickness t in mm. | Groove angle θ in degrees | Root gap in mm. | Welding voltage in V. | Welding current (1st layer) in A. | Welding current (2d layer) in A. | Welding speed in cm./min. | |
| I | Low carbon steel | 500 | 9.5 | 50 | 2 | 29 | 360 | 480 | 30 | 2 |
| II | do | 1000 | 16.0 | 50 | 2 | 31 | 380 | 600 | 32 | 4 |
| III | do | 1500 | 16.0 | 50 | 2 | 31 | 380 | 590 | 36 | 4 |

TABLE 2

| Test No. | Steel pipe piles | | Required welding time in min. | | Number of layers |
|---|---|---|---|---|---|
| | Outer diameter in mm. | Thickness t in mm. | Method of present invention | Conventional method | |
| I | 500 | 9.0 | 4 | 15 | 2 |
| II | 1500 | 16.0 | 15 | 61 | 4 |
| III | 2500 | 25.0 | 22 | 127 | 6 |

Note: The method of the present invention was carried out by a two-electrode process. The conventional method was a one-electrode process (wherein only the wire was automatically fed). The time required until the same beads were obtained in both were compared.

What is claimed is:

1. An automatic welding apparatus for butting and joining together cylindrical members such as steel pipe piles in the axial direction in a process including the driving of the steel pipe piles vertically or inclined into the ground, comprising; a cylindrical supporter engageable about one of the members, said supporter comprising a plurality of interconnected arc-shaped sections each having an inner radius slightly smaller than the outer radius of the cylindrical members to thereby enhance the engagement of said supporter about the one member, a welding machine unit mounted on said supporter for movement along the periphery thereof, said unit including a center support frame, a driving motor mounted on said frame, a roller driven by said motor and being in rolling engagement with said supporter, a current and voltage regulator on said frame, a container of at least one electrode wire located on said frame, a control board on said frame, an electrode wire feeding device mounted on said frame in engagement with said wire, an electrode wire holder on said frame for directing said wire into the joint between the cylindrical members, at least one magnetic gauge element being magnetically attracted to the one member for positioning said supporter axially along the one member, said supporter resting on said magnetic gauge element, and said magnetic gauge element including a pawl member engageable with the joint between the cylindrical members for positioning said supporter with respect to said joint.

2. The apparatus according to claim 1 wherein said supporter sections each comprise arc-shaped plate members, an arc-shaped rail section provided at the upper edge of each said plate member along with said roller engages, said plate members being interconnected by means of hinges at one of the adjoining side edges thereof, and further by means of cooperating buckle fasteners at the other adjoining side edges thereof, said plate members as assembled forming a cylinder having an inner diameter slightly smaller than the outer diameter of the one cylindrical member.

3. The apparatus according to claim 1 wherein said supporter comprises at least three arc-shaped plate members, an arc-shaped rail section being provided along the upper edge of each said plate member along which said roller engages, a plurality of magnets on the outer periphery of each said plate member and being magnetically attracted to the one member for initially positioning said supporter in place on the one member, recessed element at one end of each said plate member and cooperating projection elements at the other end of each said plate member which fit together with said respective recessed elements when said plates are assembled together, and cooperating buckle fasteners at opposite adjoining ends of said plate members compensating when interengaged for the difference in diameter between said supporter and the one cylindrical member, the assembled plate members having an inner diameter slightly less than the outer diameter of the one member.

4. The apparatus according to claim 1 wherein said unit is located closely adjacent said supporter so that, when welding an inclined cylindrical member, the center of gravity of said unit may be outside a perpendicular line from the contact point of said roller with said supporter, an annular rail member provided along the upper edge of said supporter with which said roller engages, an annular rack provided adjacent said rail, and a pinion provided adjacent said roller in engagement with said rack.

5. The apparatus according to claim 1 wherein unit is located closely adjacent said supporter so that, when welding an inclined cylindrical member, the center of gravity of said unit may be outside a perpendicular line from the contact point of said roller with said supporter, a guide rail provided along the upper edge of said supporter, said roller driven by said motor being in rolling engagement with one side of said rail, and a gripping roller being mounted on said frame of said unit in rolling engagement with an opposite side of said guide rail.

6. The apparatus according to claim 1 wherein first and second electrodes are mounted on said frame for directing two electrode wires into the joint between the cylindrical members, means separating said electrodes a predetermined distance apart, current regulating means for feeding current to said first electrode at a level as not to cause burn-through or burn-off in a first welding layer at the joint, said current regulating means feeding current to said second electrode at a lever higher than the level for said first electrode.

* * * * *